May 12, 1959 S. R. GOLDENBERG 2,886,327
METHOD AND ARTICLE FOR CAUSING RECORD PLAYERS TO REPEAT
Filed March 15, 1957
FIG. 2
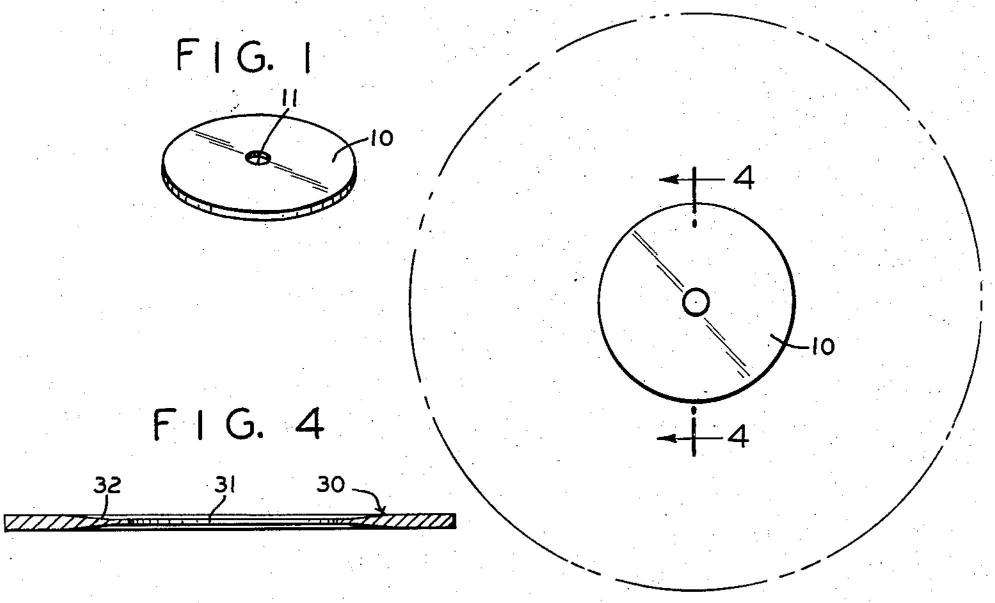
FIG. 1, FIG. 2, FIG. 4
FIG. 3
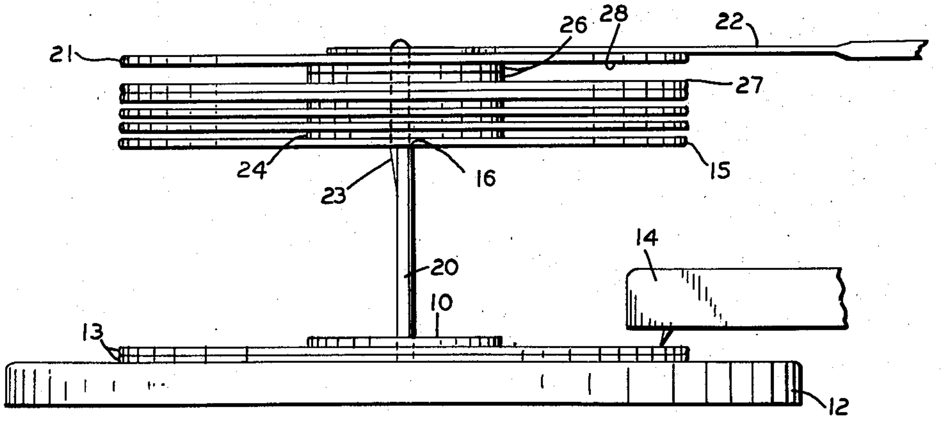
STEPHEN R. GOLDENBERG
INVENTOR.
BY: John P. Chandler
HIS ATTORNEY.

United States Patent Office 2,886,327

Patented May 12, 1959

2,886,327

METHOD AND ARTICLE FOR CAUSING RECORD PLAYERS TO REPEAT

Stephen R. Goldenberg, Brooklyn, N.Y.

Application March 15, 1957, Serial No. 646,453

1 Claim. (Cl. 274—10)

This invention relates to a device and method for enabling phonograph record playing machines to repeat the playing of a given record, or a number of records, one or more times. The modern record player is largely automatic in operation and it generally includes a non-rotating spindle extending upwardly from the center of the turntable which passes through the center opening in the records and which is formed with a short offset portion intermediate its ends providing a shelf which supports a bank of records in superimposed relation. A pusher on the spindle extending just above this shelf dislodges the lowermost record from the shelf and successively deposits these records on the turntable for playing.

The producers of the record players are mindful of the desire of many users to have a given record repeated one or more times and suitable automatic controls can be readily designed to fulfill this need. Such a system would greatly increase the cost of the record player, however, and its continuing maintenance in good playing order also presents a problem.

The control mechanism of most record players is such that if a plurality of records are placed on the spindle the records are successively played only once until the last one which will play repeatedly until the machine is turned off, provided that the record supporting arm which holds the records fast on this intermediate shelf is swung out of record range after the playing commences. In other words, the only feasible way at present to arrange for the repetition of the same numbers during a period of operation is for the user to purchase the desired records in identical pairs.

An important object of the present invention is to provide a simple article and method to accomplish the desired result, the articles being inexpensive to construct, and they provide means for repeating a given record as many times as the listener desires and the result is accomplished without altering the present highly satisfactory mechanism or interfering with its normal operation.

Modern record players vary considerably in construction and operation and the article of the present invention will not function on all machines to cause a record to repeat itself. It will, however, operate on most machines wherein an inverted L-shaped record supporting arm, pivoted on its vertical leg, is employed to engage the central portion of the uppermost record and retains the entire bank of records in horizontal position on the supporting shelf of the spindle.

After one or more records are placed on the spindle, the lowermost one being supported on the shelf, this arm is manually swung over the records and allowed to descend under spring influence so that its curved, C-shaped outer end engages the central non-grooved disc portion of the top record containing the manufacturer's label. A "start" button is now depressed and the records play successively. When the last record descends from the shelf the record supporting arm having no more records to support on the shelf, descends and closes a delayed circuit which shuts off the mechanism when that record is finished.

Returning now to the beginning of the cycle, after the first record descends to the turntable, the motor is running and the pick-up moves over to the beginning of the record groove and lowers.

After playing of the first record is completed the oscillation of the pick-up arm caused by the eccentric groove starts a new cycle by first moving the pick-up arm out of the record area of the turntable, causing the second record to drop and the cycle to repeat. The presence of the second record, now lowermost in the elevated bank of records, is necessary to start the second cycle and when this record drops from the supporting shelf of the spindle the pick-up moves inwardly as before.

It is an object of the present invention to provide a disc to be mounted on the spindle which gives the mechanism a substitute response and starts the playing of the previous record over again. This disc which is essentially a "blank" record, is structurally the same as the playing record itself, except that it is of smaller diameter and its diameter must in all events be smaller than the minimum diameter of the grooved area of the record.

If a number of records are to be played and it is desired to cause each to play twice, one repeating disc of the present invention is placed on the spindle overlying each record and if one of the records in the group is to be played three times, two of the repeating discs are superimposed over this record.

In the drawing:

Fig. 1 is a perspective view of the record repeating disc of the present invention.

Fig. 2 shows a plan view of the record in broken lines and showing the repeating disc in place thereon.

Fig. 3 is a side elevation of a record player and showing the repeating discs positioned between the record in the back.

Fig. 4 is a central section taken through a repeating disc used for records having a larger central opening.

The repeating disc of the present invention is shown at 10. It has a central opening 11 for the spindle and has a diameter less than the inside or end of the grooved sound track. In a standard 12-inch record, for instance, the sound track may end 3 inches from the center, thus leaving a central area six inches in diameter. The central label containing the title of the record and the manufacturer's trademark will usually be 3 inches in diameter. In such event the repeating disc should be 3 inches or thereabouts in diameter.

A record turntable is shown at 12 with two records 13 thereon. The needle arm 14 engages the uppermost record. A repeating disc 10 is also positioned on this record. A record 15 is suspended above records 13 and is supported on the shelf 16 associated with the non-rotating spindle 20. The uppermost record 21 is engaged on its upper face by the outer end of a vertically pivoted record supporting arm 22. This outer end is generally C-shaped and engages the central label portion of the record. It retains the record in horizontal position for otherwise they would be inclined to tilt due to the construction of the narrow shelf 16 on which they are supported.

When record 13 has finished the lever mechanism 23 dislodges record 15 from the shelf and causes it to descend to the turntable. At the conclusion of its playing the pick-up arm follows its usual cycle and moves out of the record area and allows record 15 to descend. When the playing of this record is finished the arm again moves out of record range and the mechanism calls for another record to descend. The pusher 23 operates on disc 24 placed above record 15 and this is sufficient response to cause the pick-up arm to move in to playing position.

The record, however, is record 15 which has already been played once.

There are shown two repeating discs 26 above record 27 just below top record 28 and accordingly record 27 will be played three times.

The repeating disc 30 shown in Fig. 4 is similar to disc 10 except that it has a larger central opening 31 and its thickness adjacent the opening tapers inwardly as shown at 32. This repeating disc is used with standard 45 r.p.m. records which have a central opening about 1.5 inches in diameter and the record player is usually equipped with a special spindle of this diameter and provided with opposed detents which move outwardly and support the record on two sides of the opening. These detents require that the record thickness be less at the opening and the repeating disc is similarly formed.

It will be appreciated that the method of the present invention gives a substitute response to the automatic record playing mechanism, deceiving it, as it were, but in any event causing it to play a record two or more times without altering the sequence of operation or otherwise changing the mechanism.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claim, and that all modifications that come within the meaning and range of equivalency of the claim are intended to be included therein.

What I claim is:

In an automatic record playing machine having a turntable and a spindle extending upwardly therefrom which is provided with a horizontal shelf for supporting a plurality of superimposed records which are to be successively dropped to the turntable and played, and provided further with a record changing mechanism within the spindle, the method of producing the repetition of play of one or more of the superimposed records, which method consists in superimposing on the record, the playing of which is desired to be repeated, while the record is on the spindle and before the record has been dropped onto the turntable, a blank record having a central opening of substantially the same size as the playing record and whose outer diameter is less than the diameter of the innermost sound groove of the playing record, then starting the record playing machine which drops the record from the supporting shelf to the turntable and at the completion of the playing thereof the blank record is dropped to the turntable in superimposed relation to the record thereon which has just been played and the continued automatic operation of the machine causes the playing of the first record to be repeated.

References Cited in the file of this patent

UNITED STATES PATENTS 2,645,499 Myers ------------------ July 14, 1953

FOREIGN PATENTS 381,164 Great Britain ----------- Sept. 26, 1932